(No Model.)
G. L. SHOREY.
CENTRIFUGAL MACHINE.
No. 288,129. Patented Nov. 6, 1883.
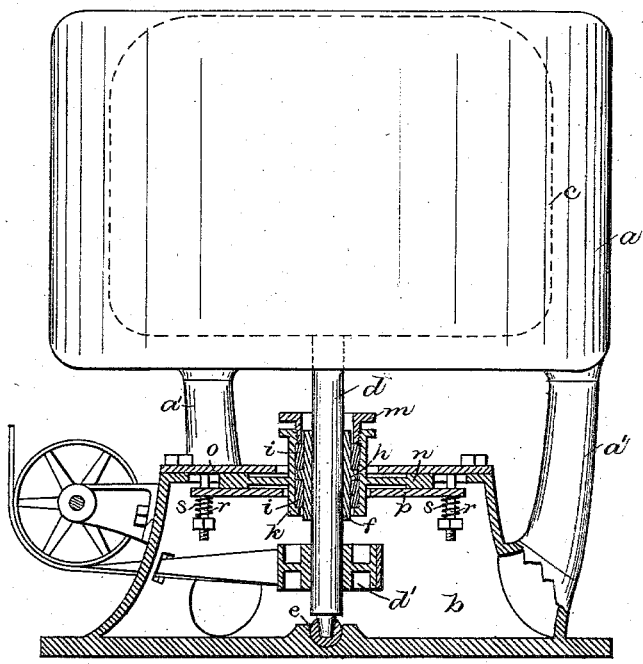
WITNESSES
Fred A. Powell
John F. C. Prinkert
INVENTOR
George L. Shorey
by
Crosby & Gregory
Attys.

UNITED STATES PATENT OFFICE.

GEORGE L. SHOREY, OF LYNN, MASSACHUSETTS.

CENTRIFUGAL MACHINE.

SPECIFICATION forming part of Letters Patent No. 288,129, dated November 6, 1883.

Application filed May 22, 1883. (No model.)

*To all whom it may concern:*

Be it known that I, GEO. L. SHOREY, of Lynn, county of Essex, State of Massachusetts, have invented an Improvement in Centrifugal Machines, of which the following description, in connection with the accompanying drawing, is a specification, like letters on the drawing representing like parts.

My invention relates to centrifugal machines such as commonly employed for separating a liquid from a solid—as in removing the water from clothes in laundry operations.

In machines of this class the load or material in the revolving basket is rarely uniformly distributed about its geometrical axis, so that the center of gravity of the rotating mass does not coincide with its axis of rotation, thus causing vibrations in the bearings of its shaft. In order to prevent these vibrations from being transmitted to the frame-work of the machine and building, the bearing has been made yielding, or elastic cushions have been interposed between the said bearings and the frame-work to absorb the said vibrations. The revolving basket is commonly mounted at the upper end of a vertical shaft, and in one class of machines the said shaft rests at its lower end upon a pivot or step, which sustains its weight, but does not tend to keep it upright, and the said shaft is further supported or held upright by a second bearing or bolster above its lower end. This bolster is connected with the fixed frame-work by springs, which are in equilibrium when the shaft is in its vertical or normal position, but which are strained when it is rocked or angularly diverted from the said normal position. In another class of machines the upper bearing or bolster is omitted, and a bearing-box at the lower end only of the shaft is used, it extending far enough up the sides of the shaft to afford a support by which the said shaft is retained in an upright position. This bearing-box is also connected with the frame-work by springs, which are in equilibrium when the shaft is vertical or in its normal position.

I apply the term "supporting-bearing" throughout the present specification to the bearing by which the shaft is held upright or prevented from tipping over.

When an unevenly loaded centrifugal machine is in operation, two phenomena are observable: first, an impulse or vibration of the shaft, which takes place at each rotation thereof, but is independent of the angular position of the shaft, and, second, a lurch or gyrating swaying of the said shaft, which may be compared to the traveling of a top in spinning. The springs in the classes of machines referred to, besides absorbing the vibrations of the shaft, also are depended upon to stop the swaying of the shaft, or to center the machine; but in such machines the greatest care is necessary in packing the basket to distribute the load as evenly as possible, as any considerable irregularity in the loading will cause the shaft to swing so much that the basket will strike against the walls of its inclosing-case, endangering the machine.

My present invention has for its object to produce a machine which will work well with considerable inequalities in loading, so that it can be operated by unskilled persons without especial care; and the invention consists in a novel construction of the support for the shaft, by which it is held upright without positive connection with the frame-work.

The supporting-bearing is shown in this instance as having a frictional connection with the frame-work, the bearing portion or sleeve in which the shaft revolves being contained in a box provided with a flange or disk surrounding the supporting-bearing, and having its periphery frictionally held between plates pressed against it. This box and disk is of considerable weight, and by its inertia resists the lateral deviations or vibrations of the shaft.

As thus far described, the machine, when rotated, will have its vibrations mainly expended on and absorbed by the inertia of the said disk, and its swaying movement will be arrested by the frictional resistance to the lateral movement of the supporting-bearing; but if there were only the frictional connection between the said bearing and frame-work, it will be seen that the shaft would remain in any angular position in which it might happen to be, not necessarily vertical or with its basket concentric to the casing. To obviate this, I also apply centering or righting springs to the supporting-bearings, which are in equilibrium when the shaft is vertical, and are strained by the inclination of the shaft relative to the box when the said shaft is turned from the vertical or normal position, the box being always retained with its axis vertical by the friction device or plates holding its flange or disk. These springs are not, as in other machines, depended upon to restrain the swaying movement of the shaft, but serve to keep it in an upright position, or to restore it to the said position if it be held away from such position by the friction device when the machine is set in motion. In this case, as the speed of rotation increases, the vibration or jar relieves the friction sufficiently to permit the righting-springs to act.

The drawing shows, mainly in vertical section, a centrifugal machine embodying this invention.

The casing $a$, mounted on legs $a'$ on a base, $b$, and the revolving basket $c$ (shown in dotted lines in the said casing) may be of any suitable or usual construction, the said basket being carried by a shaft, $d$, having a pulley, $d'$, and resting on a bearing, $e$, at its lower end, which sustains its weight, but does not support or hold the shaft upright, the invention being shown, in this instance, as embodied in a machine of that class in which the shaft-supporting bearing or bolster $f$ is at some distance above its pivot or step, between it and the point where the uneven weight is applied.

The supporting-bearing $f$ consists of a bushing of suitable material, having a flange, $h$, and surrounded by springs $i$, of rubber, inclosed in a box, $k$, and held securely in place by a follower or gland, $m$, by which the said springs may be compressed any desired amount. The said box has connected with or forming part of it a disk or flange, $n$, the periphery of which is frictionally held between two plates, $o$ $p$, the former fixed upon the base $b$, and provided with bolts $r$, passing through holes or notches in the plate $p$, springs $s$ being interposed between the said plate and nuts upon the said bolts, by which the said plates $o$ $p$ may be forced against the disk with any desired pressure.

It will be seen that neither the supporting-bearing $f$ nor the inclosing-box for it has a positive connection with the base or frame-work of the machine that rests upon the floor of the building, and consequently but slight jar is produced by vibrations of the shaft or deviations from its normal axis of rotation, due to an uneven load. The box $k$ and connected disk $n$ are of considerable weight, and consequently resist by their inertia the said deviations or vibrations, which expend their energy in moving the said parts, overcoming their inertia and the friction between the disk $n$ and plates $o$ $p$, which have openings of sufficient size to permit a considerable lateral movement of the said supporting-bearing. The springs $i$ are uniformly strained when the shaft $d$ and bearing $f$ are at right angles to the disk $n$, or vertical, and any deviation of the shaft from such position will produce uneven strains in the said springs, which will then tend by their elastic force to restore the shaft to its normal vertical position, with the bearing $f$ concentric with the base $b$, they thus constituting the righting-springs for the said shaft. For these springs to thus operate it is essential that the box $k$ should be held with its axis substantially vertical, or with the disk $n$ horizontal, and this is the primary function of the plates $o$ $p$, they also operating to frictionally resist the movement of the shaft.

The pivot or step $e$ for the shaft is arranged to rock in a socket in the base $b$, so that it does not afford any considerable resistance to the swaying or angular movement of the shaft and basket. The springs $r$ will take up wear between the disk $n$ and plates $o$ $p$, keeping the friction practically constant for a long time, and enabling it to be more delicately adjusted than it could be if the said springs were omitted, as in such event the plates might be pressed together, so as to positively hold the box $k$, or might be so loose as to permit it to rattle or deviate from a true vertical position.

I claim—

1. In a centrifugal machine, the combination of the shaft with the bearing-sleeve at an intermediate point on the shaft, the box surrounding the said bearing-sleeve, having a yielding connection with the frame-work of the machine, and the righting-spring between the box and sleeve, substantially as described.

2. The shaft and pivot or step at the extremity thereof, combined with the supporting-bearing and box surrounding and inclosing it, and the springs interposed between the said bearing and box, which latter is movable laterally with relation to the frame-work of the machine, substantially as described.

3. The shaft and its supporting-bearing, combined with the box surrounding and inclosing the said bearing, provided with a disk, and the plates frictionally holding the said disk and themselves connected with the frame-work of the machine, substantially as described.

4. The shaft and its supporting-bearing provided with a flange, and the box inclosing the said bearing, and springs $i$ therein, and disk combined with the plates connected with the frame-work of the machine, and adapted to retain the said disk in a horizontal position while permitting it to move laterally, substantially as described.

5. The shaft and its supporting-bearing and box inclosing the said bearing, provided with a disk, combined with the plates and the bolts and springs, whereby their pressure on the said disk may be controlled, substantially as described.

In testimony whereof I have signed my name to this specification in the presence of two subscribing witnesses.

GEO. L. SHOREY.

Witnesses:
JOS. P. LIVERMORE,
W. H. SIGSTON.